US012719930B2

(12) United States Patent
Chin et al.

(10) Patent No.: US 12,719,930 B2
(45) Date of Patent: Aug. 25, 2026

(54) SYSTEM FOR PROVIDING END-TO-END SECURITY SERVICE USING PORTABLE SECURITY UNIT BASED ON INTELLIGENT HOME NETWORK

(71) Applicant: U.CUBE Co., Ltd., Seoul (KR)

(72) Inventors: Young In Chin, Yongin-si (KR); Jong Seung Kim, Gunpo-si (KR); Jung Bum Kim, Goyang-si (KR)

(73) Assignee: U.CUBE Co., Ltd., Seoul (KR)

( * ) Notice: Subject to any disclaimer, the term of this patent is extended or adjusted under 35 U.S.C. 154(b) by 171 days.

(21) Appl. No.: 18/508,716

(22) Filed: Nov. 14, 2023

(65) Prior Publication Data

US 2024/0179187 A1 May 30, 2024

(30) Foreign Application Priority Data

Nov. 29, 2022 (KR) ........................ 10-2022-0163230

(51) Int. Cl.
*H04L 9/00* (2022.01)
*H04L 9/40* (2022.01)

(52) U.S. Cl.
CPC .......... *H04L 63/20* (2013.01); *H04L 63/0272* (2013.01); *H04L 63/0435* (2013.01)

(58) Field of Classification Search
CPC . H04L 63/20; H04L 63/0272; H04L 63/0435; H04L 9/40; H04L 63/0838; H04W 12/08; H04W 4/80; H04W 12/033; H04W 12/068; H04W 12/122
See application file for complete search history.

(56) References Cited

U.S. PATENT DOCUMENTS

2014/0056171 A1* 2/2014 Clegg ..................... H04W 4/80 370/254
2019/0021005 A1* 1/2019 Stan ..................... H04L 63/1425
2019/0149401 A1 5/2019 Ramachandran et al.

FOREIGN PATENT DOCUMENTS

JP 2009-253437 A 10/2009
KR 10-2005-0032856 A 4/2005
KR 10-2008-0113791 A 12/2008
KR 10-2162976 B1 10/2020
KR 10-2307837 B1 10/2021

* cited by examiner

*Primary Examiner* — Syed M Ahsan
(74) *Attorney, Agent, or Firm* — Sughrue Mion, PLLC

(57) ABSTRACT

Provided is a system for providing an end-to-end security service using a portable security unit (PSU) based on an intelligent home network. The system includes a PSU connected to a home network, a user terminal configured to access the PSU using a QR code and then connected to the Internet according to a security policy prestored in the PSU by uploading PSU information of the PSU and user information, and a security-service-providing server including a registration part configured to register, when the user terminal accesses the security-service-providing server using the QR code and uploads the PSU information and the user information, the user terminal, the PSU, the user information, and the PSU information, a security connection part configured to connect the user terminal to the Internet through the PSU according to the prestored security policy when the user terminal attempts to access the Internet, and a threat prevention part configured to block access by a threatening terminal which has not been authenticated by the PSU, through the PSU.

7 Claims, 10 Drawing Sheets

FIG. 3B

01 OUTLINE OF TECHNICAL DEVELOPMENT

DEVELOPMENT OF PORTABLE END-TO-END SECURITY SOLUTION FOR COPING WITH CYBERSECURITY THREAT TO HOME NETWORK

OBJECTIVE

- DEVELOP PORTABLE END-TO-END SECURITY SOLUTION WHICH HAS DATA CONFIDENTIALITY, INTEGRITY, AUTHENTICATION, ACCESS CONTROL, AND TRANSMISSION DATA SECURITY FUNCTIONS FOR COPING WITH CYBERSECURITY THREATS SUCH AS HACKING OF INDIVIDUAL HOUSEHOLDS IN MULTI-HOUSING BUILDING OR HOME NETWORK OF SINGLE HOUSEHOLD AND IS AVAILABLE ANYWHERE
- End Product : Portable Security Unit (H/W AND S/W), USER AUTHENTICATION MANAGEMENT SYSTEM(S/W), UNIT SECURITY MANAGEMENT USER APP(S/W)

CONTENT OF MAIN TECHNICAL DEVELOPMENT

- DEVELOP LINUX-BASED PORTABLE SECURITY UNIT H/W AND OS THEREFOR
- DEVELOP SECURITY PROTOCOL FOR PORTABLE SECURITY UNIT USER AUTHENTICATION AND CONTROL, NETWORK IDENTIFICATION, ETC. USING QR CODE OR BLUETOOTH
- DEVELOP END-TO-END SECURITY SOLUTION HAVING TRANSMISSION DATA SECURITY FUNCTION SUCH AS VPN, DATA ENCRYPTION, ETC.
- DEVELOP PERSONAL FIREWALL FUNCTION SUCH AS NAT, PORT CONTROL, AND PACKET BLOCKING

EXPECTED EFFECTS

| STRENGTHEN SECURITY THROUGH HACKING PREVENTION | CONTRIBUTE TO SAFE INFORMATION CIRCULATION | REDUCE CONSTRUCTION AND OPERATION COSTS |
| --- | --- | --- |
| · STRENGTHEN SECURITY BY IMPLEMENTING AND RUNNING SAFE INTERNAL ENVIRONMENT AGAINST VARIOUS EXTERNAL SECURITY THREATS<br>· ENSURE STABILITY BY SETTING AND APPLYING SECURITY POLICY FOR EACH HOUSEHOLD | · ESTABLISH SAFE INFORMATION CIRCULATION SYSTEM FOR MAIN INFORMATION, INDIVIDUAL PRIVACY, ETC. | · REDUCE CONSTRUCTION COSTS COMPARED TO PHYSICAL AND LOGICAL METHODS<br>· REDUCE MANAGEMENT MANPOWER AND COSTS FOR ADDITIONAL SECURITY EQUIPMENT |

※HOME NETWORK CYBERSECURITY THREAT: MALICIOUS CODE DISTRIBUTION, DATA TAMPERING, SENSOR JAMMING OF EXTERNALLY MANIPULATING SENSOR SIGNAL, LEAKAGE OF PRIVATE INFORMATION THROUGH WALL PAD HACKING, ETC.

FIG. 3C

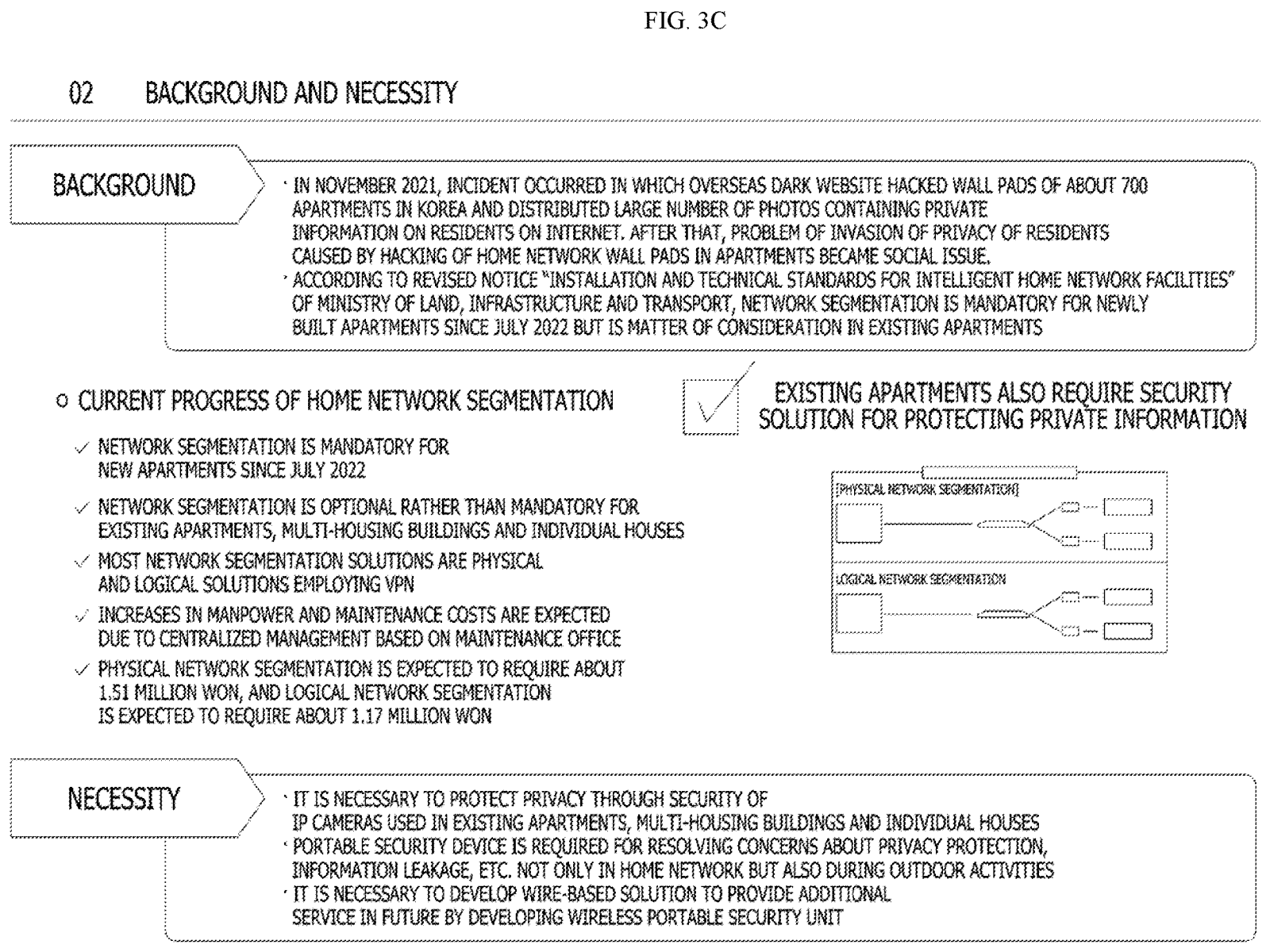

02 BACKGROUND AND NECESSITY

BACKGROUND

- IN NOVEMBER 2021, INCIDENT OCCURRED IN WHICH OVERSEAS DARK WEBSITE HACKED WALL PADS OF ABOUT 700 APARTMENTS IN KOREA AND DISTRIBUTED LARGE NUMBER OF PHOTOS CONTAINING PRIVATE INFORMATION ON RESIDENTS ON INTERNET. AFTER THAT, PROBLEM OF INVASION OF PRIVACY OF RESIDENTS CAUSED BY HACKING OF HOME NETWORK WALL PADS IN APARTMENTS BECAME SOCIAL ISSUE.
- ACCORDING TO REVISED NOTICE "INSTALLATION AND TECHNICAL STANDARDS FOR INTELLIGENT HOME NETWORK FACILITIES" OF MINISTRY OF LAND, INFRASTRUCTURE AND TRANSPORT, NETWORK SEGMENTATION IS MANDATORY FOR NEWLY BUILT APARTMENTS SINCE JULY 2022 BUT IS MATTER OF CONSIDERATION IN EXISTING APARTMENTS

○ CURRENT PROGRESS OF HOME NETWORK SEGMENTATION

- ✓ NETWORK SEGMENTATION IS MANDATORY FOR NEW APARTMENTS SINCE JULY 2022
- ✓ NETWORK SEGMENTATION IS OPTIONAL RATHER THAN MANDATORY FOR EXISTING APARTMENTS, MULTI-HOUSING BUILDINGS AND INDIVIDUAL HOUSES
- ✓ MOST NETWORK SEGMENTATION SOLUTIONS ARE PHYSICAL AND LOGICAL SOLUTIONS EMPLOYING VPN
- ✓ INCREASES IN MANPOWER AND MAINTENANCE COSTS ARE EXPECTED DUE TO CENTRALIZED MANAGEMENT BASED ON MAINTENANCE OFFICE
- ✓ PHYSICAL NETWORK SEGMENTATION IS EXPECTED TO REQUIRE ABOUT 1.51 MILLION WON, AND LOGICAL NETWORK SEGMENTATION IS EXPECTED TO REQUIRE ABOUT 1.17 MILLION WON

✓ EXISTING APARTMENTS ALSO REQUIRE SECURITY SOLUTION FOR PROTECTING PRIVATE INFORMATION

[PHYSICAL NETWORK SEGMENTATION]

LOGICAL NETWORK SEGMENTATION

NECESSITY

- IT IS NECESSARY TO PROTECT PRIVACY THROUGH SECURITY OF IP CAMERAS USED IN EXISTING APARTMENTS, MULTI-HOUSING BUILDINGS AND INDIVIDUAL HOUSES
- PORTABLE SECURITY DEVICE IS REQUIRED FOR RESOLVING CONCERNS ABOUT PRIVACY PROTECTION, INFORMATION LEAKAGE, ETC. NOT ONLY IN HOME NETWORK BUT ALSO DURING OUTDOOR ACTIVITIES
- IT IS NECESSARY TO DEVELOP WIRE-BASED SOLUTION TO PROVIDE ADDITIONAL SERVICE IN FUTURE BY DEVELOPING WIRELESS PORTABLE SECURITY UNIT

FIG. 3E

04 MAIN CONSTITUENT ITEMS

| CONSTITUENT ITEMS | MAIN FUNCTIONS |
|---|---|
| LAN CPU Mem LAN2<br>Portable Security Unit | PORTABLE SECURITY DEVICE - FIREWALL EQUIPPED WITH CPU AND MEMORY, VPN-BASED DEDICATED PORTABLE SECURITY DEVICE<br>- PROTECT DATA TRANSMISSION SECTION OF HOME NETWORK (OR NETWORK SEGMENTATION) USING DATA ENCRYPTION OR VPN TECHNOLOGY<br>- PREVENT HACKER OR UNAUTHORIZED USER FROM ACCESSING IOT DEVICE AND PC IN HOME NETWORK<br>- USER AUTHENTICATION FUNCTION EMPLOYING QR CODE OR BLUETOOTH AND FUNCTION OF BLOCKING ACCESS TO PORTABLE SECURITY UNIT USING IP ADDRESS AND MAC ADDRESS<br>- INCLUDE LINUX-BASED DEDICATED OS AND DBMS<br>- PROVIDE C TYPE CONNECTOR BY DEFAULT (REQUIRES ADDITIONAL DISCUSSION) ~ LAN PORT OR CHARGING PORT |
| USER AUTHENTICATION SERVER | USER AUTHENTICATION SERVER - INITIAL AND ADDITIONAL USER AUTHENTICATION MANAGEMENT SYSTEM<br>- AUTHENTICATE INITIAL USER OF PORTABLE SECURITY UNIT USING QR CODE AND OTP<br>- AUTHENTICATE ADDITIONAL USER USING PUSH FUNCTION<br>- DOWNLOAD USER APP, REGISTER USER DEVICE, REQUEST SERVICE, AND MANAGE CERTIFICATE AND KEY<br>- FUNCTION OF AUTHENTICATING ADDITIONAL USER AND SERVICE CHARGING FUNCTION FOR SERVICE USE (REQUIRES ADDITIONAL DISCUSSION) |
| USER APP<br>(SECURITY POLICY MANAGEMENT) | USER APP (SECURITY POLICY MANAGEMENT) - PSU SECURITY POLICY SETTING, LOG MANAGEMENT AND MONITORING<br>- SET FIREWALL AND VPN POLICY OF PORTABLE SECURITY UNIT<br>- MONITOR AND CONTROL FIREWALL AND VPN POLICY OF PORTABLE SECURITY UNIT IN REAL TIME<br>- MANAGE LOG OF PORTABLE SECURITY UNIT |

FIG. 4A

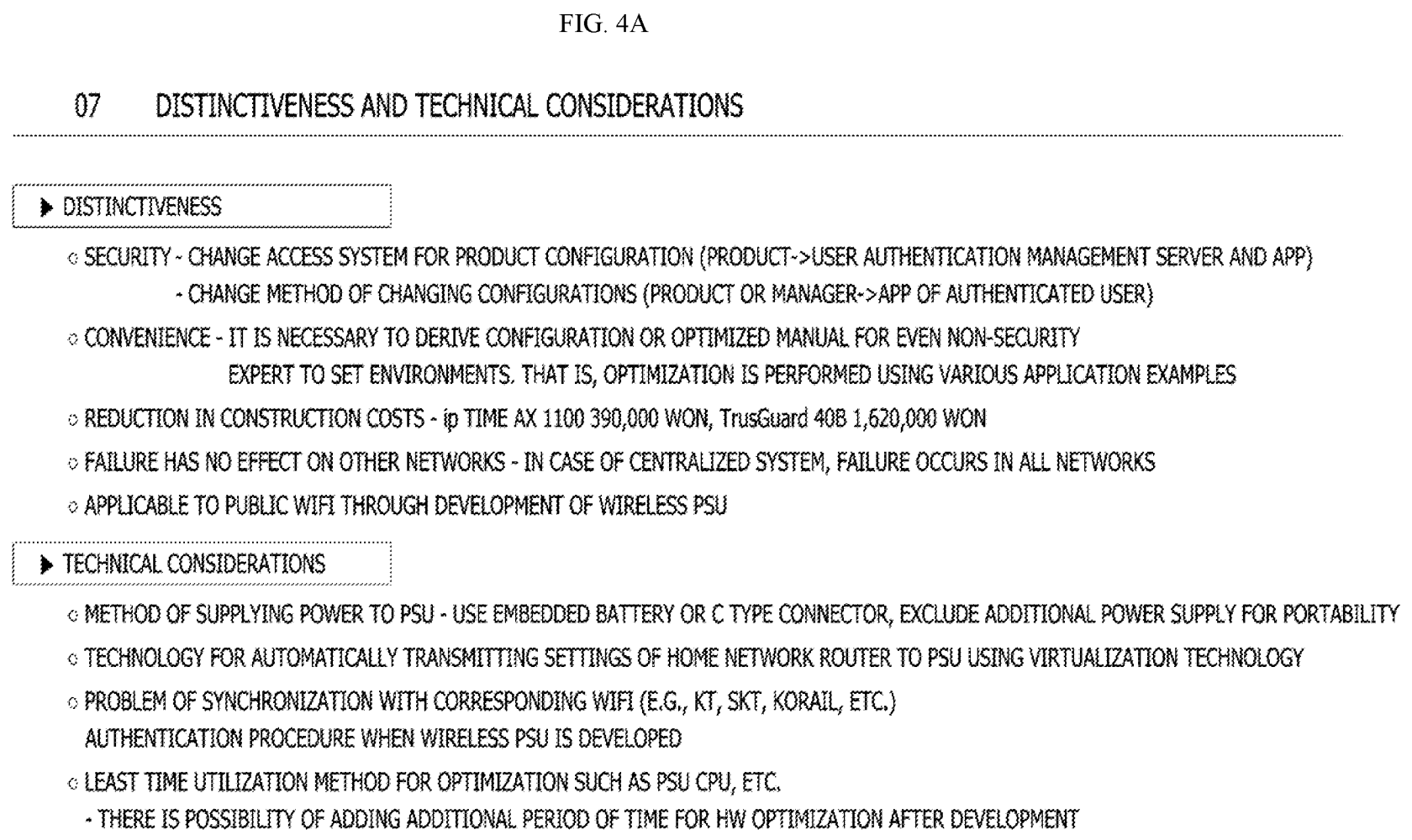

07 DISTINCTIVENESS AND TECHNICAL CONSIDERATIONS

▶ DISTINCTIVENESS

- SECURITY - CHANGE ACCESS SYSTEM FOR PRODUCT CONFIGURATION (PRODUCT->USER AUTHENTICATION MANAGEMENT SERVER AND APP)
  - CHANGE METHOD OF CHANGING CONFIGURATIONS (PRODUCT OR MANAGER->APP OF AUTHENTICATED USER)
- CONVENIENCE - IT IS NECESSARY TO DERIVE CONFIGURATION OR OPTIMIZED MANUAL FOR EVEN NON-SECURITY EXPERT TO SET ENVIRONMENTS. THAT IS, OPTIMIZATION IS PERFORMED USING VARIOUS APPLICATION EXAMPLES
- REDUCTION IN CONSTRUCTION COSTS - ip TIME AX 1100 390,000 WON, TrusGuard 40B 1,620,000 WON
- FAILURE HAS NO EFFECT ON OTHER NETWORKS - IN CASE OF CENTRALIZED SYSTEM, FAILURE OCCURS IN ALL NETWORKS
- APPLICABLE TO PUBLIC WIFI THROUGH DEVELOPMENT OF WIRELESS PSU

▶ TECHNICAL CONSIDERATIONS

- METHOD OF SUPPLYING POWER TO PSU - USE EMBEDDED BATTERY OR C TYPE CONNECTOR, EXCLUDE ADDITIONAL POWER SUPPLY FOR PORTABILITY
- TECHNOLOGY FOR AUTOMATICALLY TRANSMITTING SETTINGS OF HOME NETWORK ROUTER TO PSU USING VIRTUALIZATION TECHNOLOGY
- PROBLEM OF SYNCHRONIZATION WITH CORRESPONDING WIFI (E.G., KT, SKT, KORAIL, ETC.) AUTHENTICATION PROCEDURE WHEN WIRELESS PSU IS DEVELOPED
- LEAST TIME UTILIZATION METHOD FOR OPTIMIZATION SUCH AS PSU CPU, ETC.
  - THERE IS POSSIBILITY OF ADDING ADDITIONAL PERIOD OF TIME FOR HW OPTIMIZATION AFTER DEVELOPMENT

FIG. 4B

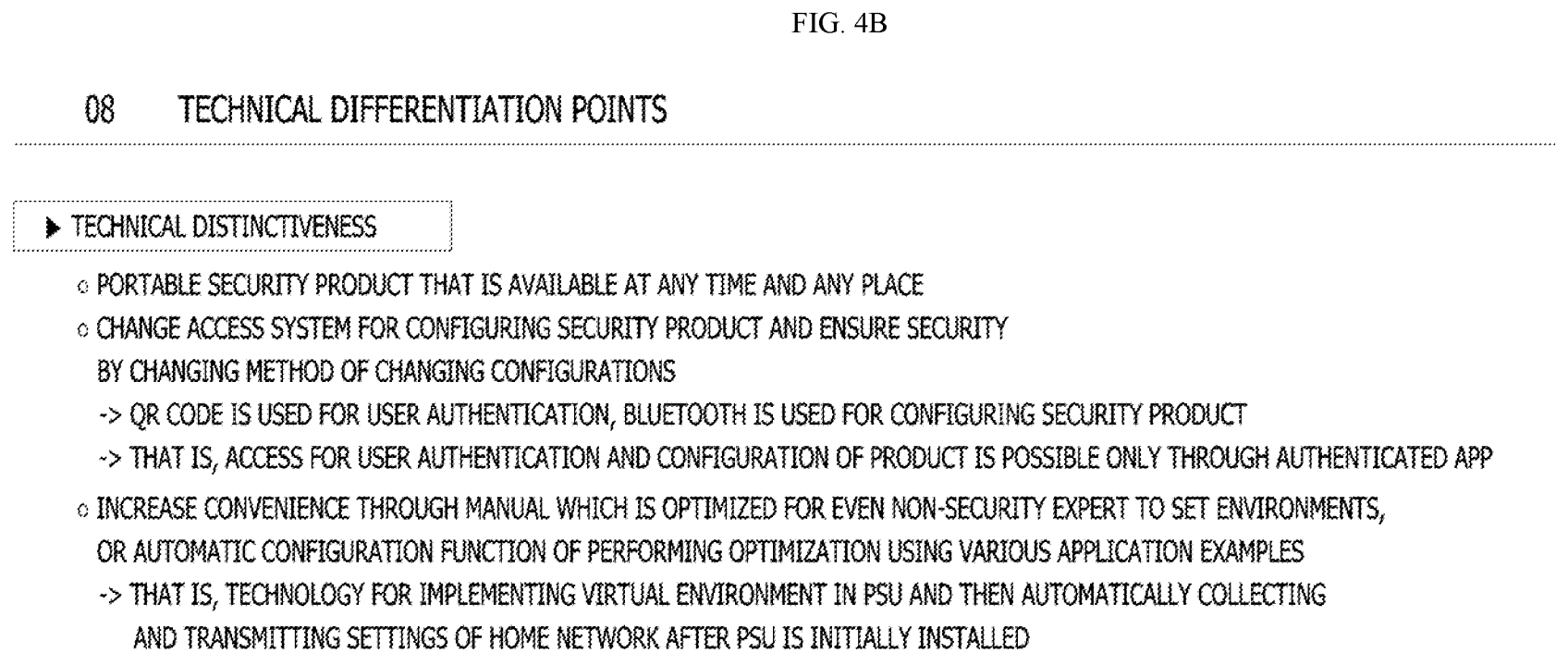

08 TECHNICAL DIFFERENTIATION POINTS

▶ TECHNICAL DISTINCTIVENESS

- PORTABLE SECURITY PRODUCT THAT IS AVAILABLE AT ANY TIME AND ANY PLACE
- CHANGE ACCESS SYSTEM FOR CONFIGURING SECURITY PRODUCT AND ENSURE SECURITY BY CHANGING METHOD OF CHANGING CONFIGURATIONS
  -> QR CODE IS USED FOR USER AUTHENTICATION, BLUETOOTH IS USED FOR CONFIGURING SECURITY PRODUCT
  -> THAT IS, ACCESS FOR USER AUTHENTICATION AND CONFIGURATION OF PRODUCT IS POSSIBLE ONLY THROUGH AUTHENTICATED APP
- INCREASE CONVENIENCE THROUGH MANUAL WHICH IS OPTIMIZED FOR EVEN NON-SECURITY EXPERT TO SET ENVIRONMENTS, OR AUTOMATIC CONFIGURATION FUNCTION OF PERFORMING OPTIMIZATION USING VARIOUS APPLICATION EXAMPLES
  -> THAT IS, TECHNOLOGY FOR IMPLEMENTING VIRTUAL ENVIRONMENT IN PSU AND THEN AUTOMATICALLY COLLECTING AND TRANSMITTING SETTINGS OF HOME NETWORK AFTER PSU IS INITIALLY INSTALLED

SYSTEM FOR PROVIDING END-TO-END SECURITY SERVICE USING PORTABLE SECURITY UNIT BASED ON INTELLIGENT HOME NETWORK

CROSS-REFERENCE TO RELATED APPLICATION

This application claims priority to and the benefit of Korean Patent Application No. 2022-0163230, filed on Nov. 29, 2022, the disclosure of which is incorporated herein by reference in its entirety.

BACKGROUND

1. Field of the Invention

The present invention relates to a system for providing an end-to-end security service using a portable security unit (PSU) based on an intelligent home network, and more specifically, to a system for fundamentally preventing infiltration by a hacker using a quick response (QR) code and Bluetooth in the case of initial registration in a PSU, achieving data encryption and network segmentation through the PSU between a home network and an Internet network, applying an end-to-end security solution, and thereby eliminating security threats.

2. Discussion of Related Art

Due to the emergence of the Fourth Industrial Revolution, interest in smart home technology for connecting various services, such as wired and wireless communication and cloud services on the basis of the Internet of things (IoT) is increasing. Among smart home devices, a wall pad provides various functions necessary for convenience at home, such as front door control, video calls between households, and closed-circuit television (CCTV) image check as well as a video door phone function, lighting, and temperature and humidity control, so that all IoT-based home appliances can be controlled with simple operations. However, the wall pad is in control of all IoT devices in the household, and thus when the wall pad is occupied by a malicious hacker, the hacker obtains the right to control all the IoT devices in the household. Therefore, the Ministry of Land, Infrastructure and Transport issued a notice about the installation and technical standard for intelligent home network facilities and made network segmentation mandatory.

Solutions for countering security threats to home networks are being researched and developed. As technology related thereto, Korean Patent Registration No. 10-2307837 (published Oct. 5, 2021) and Korean Patent Application Publication No. 2008-0113791 (published Dec. 31, 2008) disclose a configuration in which a security module is installed in a home network hub device for collecting and processing home network data and detects a security threat in connection with a central server and a configuration in which a security management agent is installed in a home gateway to manage security according to a security management policy set by a user and a security management client is installed on an open service gateway initiative (OSGi) framework of the home gateway to provide a dynamic security management service, respectively.

However, in the former case, when the security module detects a security threat in connection with the central server, hacking may occur in a process of sending a packet from the security module to the central server. In the latter case, there is a connection to the home gateway, but the home gateway is connectable without mutual authentication or pairing as long as there is an Internet connection. Therefore, a hacker may also be registered as a user in the home gateway. In addition, according to the notice of the Ministry of Land, Infrastructure and Transport, network segmentation is not mandatory but optional for existing apartments, apartment houses, and individual houses. Although network segmentation was made mandatory, most physical and logical network segmentation solutions employ a virtual private network (VPN), so it would only lead to an increase in management manpower. Further, network segmentation alone cannot prevent security problems such as unauthorized access to a main distribution frame (MDF) or an intermediate distribution frame (IDF) or stealing of data transmitted from a wall pad to a central server. In 2016, a so-called defense network hacking incident occurred in which a hacker broke into a network segmentation environment managed by the Defense Integrated Data Center (DIDC) for managing all military information technology (IT) services including each military website and intranet, spread malicious code, and leaked internal data. Therefore, it is necessary to research and develop a system to which an end-to-end security solution is applicable and that allows Internet access and data communication for only an authenticated user and device without excessive modifications in infrastructure or additional costs.

SUMMARY OF THE INVENTION

The present invention is directed to providing a system for providing an end-to-end security service using a portable security unit (PSU) based on an intelligent home network which may fundamentally block a path for a hacker to access a home network through Internet access alone by performing initial authentication through a quick response (QR) code, a one-time password (OTP), and Bluetooth pairing in the case of connecting a PSU to a user terminal, apply an end-to-end security solution by simply providing the PSU and authenticating and registering the user terminal without communication with a security-service-providing server due to a security policy and an operating system (OS) installed in the PSU, and eliminate a possibility that a hacker will access an Internet of things (IoT) device or take data and protect a data transmission section through data encryption and a virtual private network (VPN) by allowing only the user terminal registered and authenticated through the PSU to transmit and receive data to and from the IoT device when the user terminal registers the IoT device using a user policy management solution.

Technical objectives to be achieved by the present invention are not limited to that described above, and other technical objectives may be present.

According to an aspect of the present invention, there is provided a system for providing an end-to-end security service using a PSU based on an intelligent home network, the system including a PSU connected to a home network, a user terminal configured to access the PSU using a QR code and then connected to the Internet according to a security policy prestored in the PSU by uploading PSU information of the PSU and user information, and a security-service-providing server including a registration part configured to register, when the user terminal accesses the security-service-providing server using the QR code and uploads the PSU information and the user information, the user terminal, the PSU, the user information, and the PSU information, a security connection part configured to connect the user terminal to the Internet through the PSU according to the prestored security policy when the user terminal attempts to access the Internet, and a threat prevention part configured to block access by a threatening terminal which has not been authenticated by the PSU, through the PSU.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 3A to 3E, and FIGS. 4A and 4B are diagrams illustrating an exemplary embodiment in which an end-to-end security service using a PSU based on an intelligent home network according to an exemplary embodiment of the present invention is implemented.

DETAILED DESCRIPTION OF EXEMPLARY EMBODIMENTS

Figure 1:
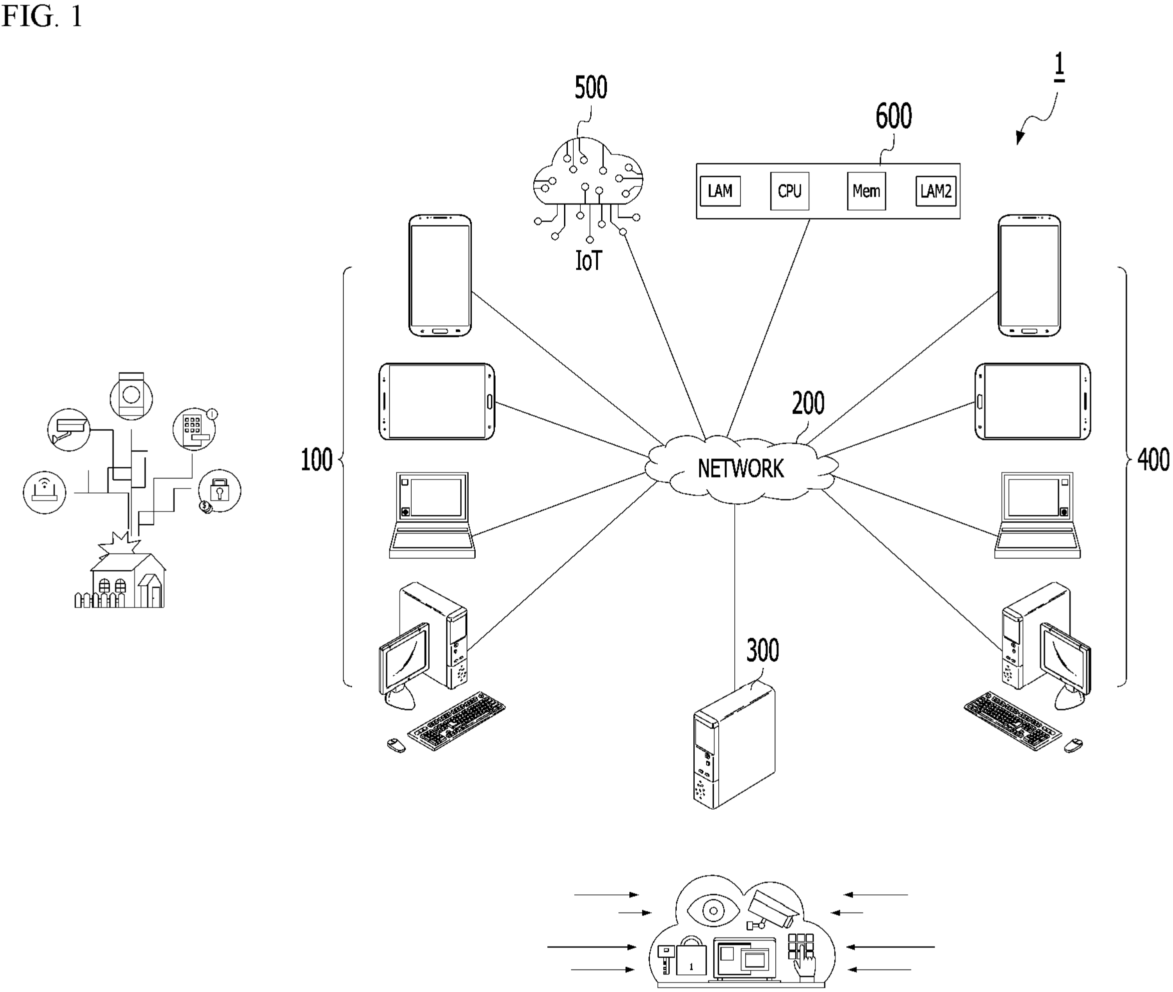
FIG. 1 is a diagram illustrating a system for providing an end-to-end security service using a portable security unit (PSU) based on an intelligent home network according to an exemplary embodiment of the present invention.

Hereinafter, exemplary embodiments of the present invention will be described in detail so that those of ordinary skill in the art can readily implement the present invention. However, the present invention can be implemented in several different forms and is not limited to the exemplary embodiments described below. To clearly describe the present invention, parts unrelated to description will be omitted in the drawings. Throughout the specification, like reference numerals refer to like elements.

In the specification, when an element is referred to as being "connected" to another element, the elements may be "directly connected" to each other or "electrically connected" to each other with an intervening element therebetween. Also, when a part is referred to as "including" a certain component, other components are not excluded but may be further included unless particularly stated otherwise. It is to be understood that the expression does not preclude the presence or addition of one or more other features, numbers, steps, operations, components, parts, or a combination thereof.

As used throughout the specification, the terms "about," "substantially," and the like are used to indicate a value or a nearby value when unique manufacturing and material tolerances are presented for a described meaning, and the terms are used to prevent unscrupulous infringers from unfairly using the disclosure including accurate or absolute figures for aiding in the understanding of the present invention. The term "step of (doing)" or "step of" used throughout the specification of the present invention does not indicate "step for."

In the specification, "part" includes a unit implemented by hardware, a unit implemented by software, and a unit implemented using both. In addition, one part may be implemented using two or more pieces of hardware, and two or more parts may be implemented using one piece of hardware. Meanwhile, the meaning of "part" is not limited to software or hardware, and a "part" may be configured to be present in an addressable storage medium or run one or more processors. Therefore, as examples, a "part" includes components, such as software components, object-oriented software components, class components, and task components, processes, functions, attributes, procedures, subroutines, segments of program code, drivers, firmware, microcode, a circuit, data, a database, data structures, tables, arrays, and variables. Functions provided in components and "parts" may be combined into a smaller number of components and "parts" or may be subdivided into additional components and "parts." Further, components and "parts" may be implemented to run one or more central processing units (CPUs) in a device or security multimedia card.

In the specification, some operations or functions described as being performed by a terminal, an apparatus, or a device may be performed by a server connected to the terminal, the apparatus, or the device instead. Likewise, some operations or functions described as being performed by a server may be performed by a terminal, an apparatus, or a device connected to the server instead.

In the specification, some operations or functions described as "mapping" or "matching" a terminal may be construed as "mapping" or "matching" a unique number of the terminal or personal identification information which is identifying data of the terminal.

The present invention will be described in detail below with reference to the accompanying drawings.

FIG. 1 is a diagram illustrating a system for providing an end-to-end security service using a portable security unit (PSU) based on an intelligent home network according to an exemplary embodiment of the present invention. Referring to FIG. 1, the system 1 for providing an end-to-end security service using a PSU based on an intelligent home network may include at least one user terminal 100, a security-service-providing server 300, at least one additional terminal 400, at least one Internet of things (IoT) device 500, and a PSU 600. However, the system 1 for providing an end-to-end security service using a PSU based on an intelligent home network is merely an exemplary embodiment of the present invention, and the present invention is not limited to FIG. 1.

The components of FIG. 1 are generally connected through a network 200. For example, as shown in FIG. 1, the at least one user terminal 100 may be connected to the security-service-providing server 300 through the network 200. The security-service-providing server 300 may be connected to the at least one user terminal 100, the at least one additional terminal 400, the at least one IoT device 500, and the PSU 600 through the network 300. Also, the at least one additional terminal 400 may be connected to the security-service-providing server 300 through the network 200. The at least one IoT device 500 may be connected to the at least one user terminal 100, the security-service-providing server 300, and the at least one additional terminal 400 through the network 200. Finally, the PSU 600 may be connected to the user terminal 100, the additional terminal 400, the security-service-providing server 300, and the at least one IoT device 500 through the network 200.

The network 200 is a connection structure in which nodes, such as a plurality of terminals and servers, may exchange information. Examples of the network 200 include a local area network (LAN), a wide area network (WAN), the Internet (World Wide Web (WWW)), a wired or wireless data communication network, a public switched telephone network (PSTN), a wired or wireless television (TV) communication network, and the like. Examples of a wireless data communication network include, but are not limited to, a third generation (3G) network, a fourth generation (4G) network, a fifth generation (5G) network, a third generation partnership project (3GPP) network, a fifth generation partnership project (5GPP) network, a Long Term Evolution (LTE) network, a World Interoperability for Microwave Access (WIMAX) network, Wi-Fi, the Internet, a LAN, a wireless LAN, a WAN, a personal area network (PAN), a radio frequency (RF) network, a Bluetooth network, a near-field communication (NFC) network, a satellite broadcasting network, an analog broadcasting network, a digital multimedia broadcasting network, and the like.

The phrase "at least one" is defined to include the singular and the plural. Even when the phrase "at least one" is not used, each component may be singular or plural in number and may represent the singular or plural. As for each component, a single component or a plurality of components may be provided depending on embodiments.

The at least one user terminal 100 may be a terminal that accesses the PSU 600 through a webpage, an app page, a program, or an application related to an end-to-end security service employing a PSU based on an intelligent home network using a quick response (QR) code and Bluetooth, registers the PSU 600 in the security-service-providing server 300, is designated as a master by performing user authentication of the user terminal 100, and then registers the IoT device 500 and the additional terminal 400. The user terminal 100 may be a terminal that accesses the Internet through a home network gateway and the PSU 600.

Here, the at least one user terminal 100 may be implemented as a computer that may access a server or terminal at a remote place through a network. The computer may be, for example, a navigation device, a notebook computer, a desktop computer, or a laptop computer on which a web browser is installed, or the like. The at least one user terminal 100 may be implemented as a terminal that may access a server or terminal at a remote place through a network. The at least one user terminal 100 is, for example, a wireless communication device with portability and mobility and may be any type of handheld wireless communication device such as a navigation device, a Personal Communication System (PCS) device, a Global System for Mobile communication (GSM) device, a Personal Digital Cellular (PDC) device, a Personal Handyphone System (PHS) device, a Personal Digital Assistant (PDA) device, an International Mobile Telecommunication (IMT)-2000 device, a code division multiple access (CDMA)-2000 device, a wideband CDMA (W-CDMA) device, a wireless broadband Internet (WiBro) terminal, a smartphone, a smartpad, a tablet personal computer (PC), or the like.

The security-service-providing server 300 may be a server that provides the webpage, the app page, the program, or the application related to an end-to-end security service employing a PSU based on an intelligent home network. The security-service-providing server 300 may be a server that accesses, when the user terminal 100 registers the PSU 600, the PSU 600 using a QR code and Bluetooth, uploads PSU information of the PSU 600, and registers user information of the user terminal 100 so that the PSU 600 and the user terminal 100 are registered. Also, the security-service-providing server 300 may be a server that designates the user terminal 100 of an authenticated user as a master terminal and allows the user terminal 100 to register the IoT device 500 and the additional terminal 400 using a user policy management solution and output real-time monitoring and threat detection results.

The security-service-providing server 300 may be implemented as a computer that may access a server or terminal at a remote place through a network. Here, the computer may be, for example, a navigation device, a notebook computer, a desktop computer, or a laptop computer on which a web browser is installed, or the like.

The at least one additional terminal 400 may be a terminal that is registered to use a home network by the user terminal 100 using the webpage, the app page, the program, or the application related to an end-to-end security service employing a PSU based on an intelligent home network.

The at least one additional terminal 400 may be implemented as a computer that may access a server or terminal at a remote place through a network. Here, the computer may be, for example, a navigation device, a notebook computer, a desktop computer, or a laptop computer on which a web browser is installed, or the like. The at least one additional terminal 400 may be implemented as a terminal that may access a server or terminal at a remote place through a network. The at least one additional terminal 400 is, for example, a wireless communication device with portability and mobility and may be any type of handheld wireless communication device such as a navigation device, a PCS device, a GSM device, a PDC device, a PHS device, a PDA device, an IMT-2000 device, a CDMA-2000 device, a W-CDMA device, a WiBro terminal, a smartphone, a smartpad, a tablet PC, or the like.

The at least one IoT device 500 may be a refrigerator, an air conditioner, a TV, a printer, a vacuum, a door lock, a CCTV, or the like registered by the user terminal 100 through the webpage, the app page, the program, or the application related to an end-to-end security service employing a PSU based on an intelligent home network.

The at least one IoT device 500 may be implemented as a computer that may access a server or terminal at a remote place through a network. Here, the computer may be, for example, a navigation device, a notebook computer, a desktop computer, or a laptop computer on which a web browser is installed, or the like. The at least one IoT device 500 may be implemented as a terminal that may access a server or terminal at a remote place through a network. The at least one IoT device 500 is, for example, a wireless communication device with portability and mobility and may be any type of handheld wireless communication device such as a navigation device, a PCS device, a GSM device, a PDC device, a PHS device, a PDA device, an IMT-2000 device, a CDMA-2000 device, a W-CDMA device, a WiBro terminal, a smartphone, a smartpad, a tablet PC, or the like.

The PSU 600 may be a device that is connected between a home network gateway and an Internet network through the webpage, the app page, the program, or the application related to an end-to-end security service employing a PSU based on an intelligent home network to perform security processing on Internet access of the user terminal 100, implement virtual network segmentation, perform end-to-end encryption, and block access by an unauthenticated terminal.

The PSU 600 may be implemented as a computer that may access a server or terminal at a remote place through a network. The computer may be, for example, a navigation device, a notebook computer, a desktop computer, or a laptop computer on which a web browser is installed, or the like. The PSU 600 may be implemented as a terminal that may access a server or terminal at a remote place through a network. The PSU 600 is, for example, a wireless communication device with portability and mobility and may be any type of handheld wireless communication device such as a navigation device, a PCS device, a GSM device, a PDC device, a PHS device, a PDA device, an IMT-2000 device, a CDMA-2000 device, a W-CDMA device, a WiBro terminal, a smartphone, a smartpad, a tablet PC, or the like.

Figure 2:
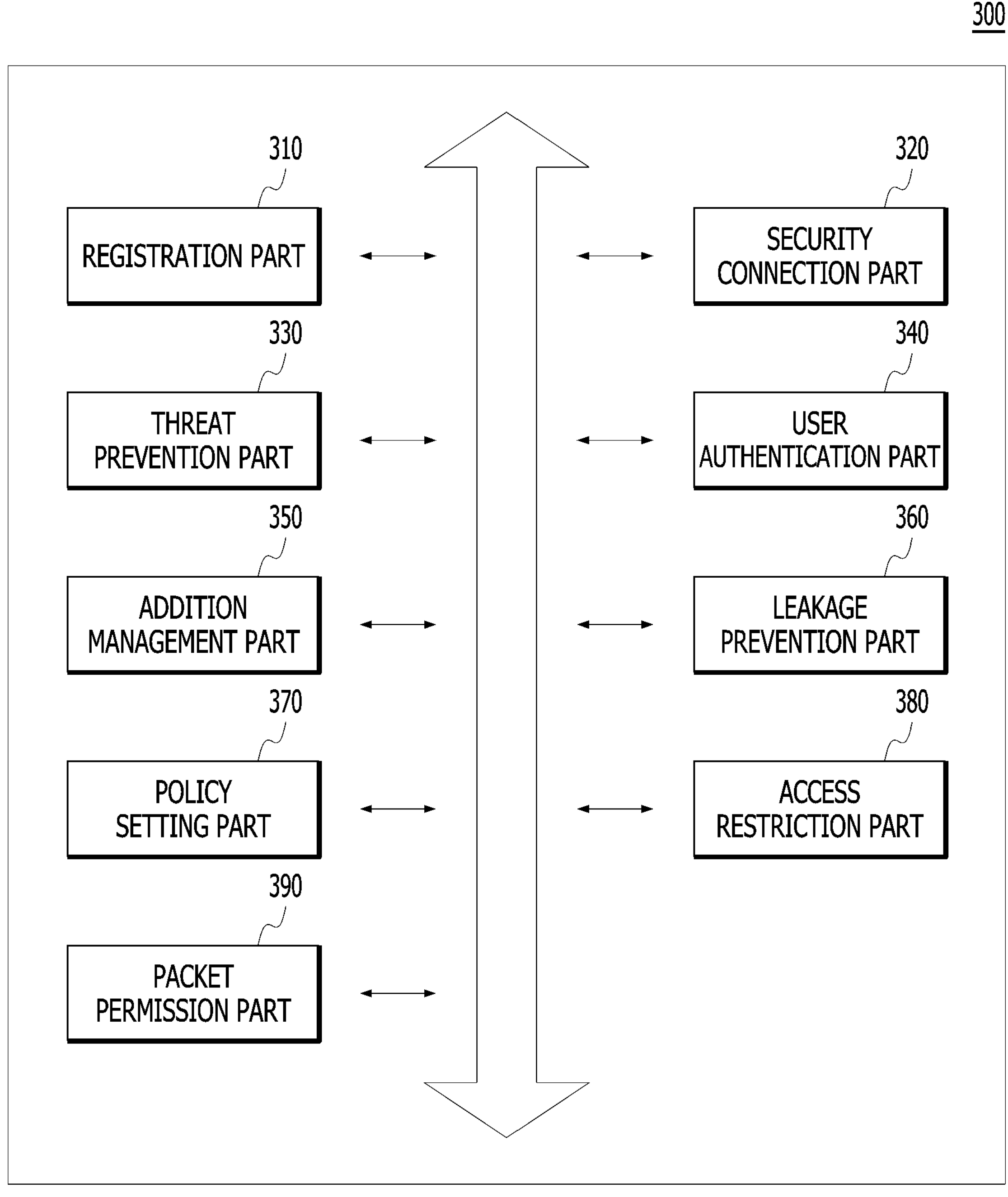
FIG. 2 is a block diagram illustrating a security-service-providing server included in the system of FIG. 1.

FIG. 2 is a block diagram illustrating the security-service-providing server included in the system of FIG. 1, and FIGS. 3A to 3E, 4A and 4B are diagrams illustrating an exemplary embodiment in which an end-to-end security service using a PSU based on an intelligent home network according to an exemplary embodiment of the present invention is implemented.

Referring to FIG. 2, the security-service-providing server 300 may include a registration part 310, a security connection part 320, a threat prevention part 330, a user authentication part 340, an addition management part 350, a leakage prevention part 360, a policy setting part 370, an access restriction part 380, and a packet permission part 390.

When the security-service-providing server 300 according to the exemplary embodiment of the present invention or another server (not shown) interoperating therewith transmits the application, the program, the app page, the webpage, or the like related to an end-to-end security service employing a PSU based on an intelligent home network to the at least one user terminal 100, the at least one additional terminal 400, the at least one IoT device 500, and the PSU 600, the at least one user terminal 100, the at least one additional terminal 400, the at least one IoT device 500, and the PSU 600 may install or open the application, the program, the app page, the webpage, or the like related to an end-to-end security service employing a PSU based on an intelligent home network. Also, the service program may be run on the at least one user terminal 100, the at least one additional terminal 400, the at least one IoT device 500, and the PSU 600 using a script executed on a web browser. Here, the web browser is a program that allows use of the web (WWW) service by receiving and displaying hypertext written in hypertext markup language (HTML). For example, the web browser is Netscape, Explorer, Chrome, or the like. Also, the application is an application program on a terminal. For example, the application is an app executed on a mobile terminal (smartphone).

Before FIG. 2 is described, the basic concept of a configuration to be described in FIG. 2 will be described below. The following description will not be repeated in FIG. 2.

<Smart Home>

The concept of a smart home includes various services and a smart home solution which interoperates with and controls various smart devices, such as information appliances, energy management devices, air conditioning and ventilation devices, and home entertainment devices, or communication devices in a network infrastructure environment including wired and wireless networks. A smart home uses eco-friendly energy and provides various services so that a user can lead a safe life. In Korea, smart homes are actively being researched and adopted to provide safe and convenient houses to residents by communication service providers with communication networks and construction companies which construct apartments. Also, the smart home industry is a fusion of various fields, such as the communication industry, the broadcast industry, the home appliance industry, the construction industry, the content industry, and the like, and is also a field attracting attention as an industry that may continuously create added value through a value chain with a larger inter-industry ripple effect.

The most important thing in a smart home is to connect various information devices, communication devices, and the like in the house to a network, and a service is provided through the network in and outside the house. The configuration of the smart home network may be roughly divided into an internal network in the house and an external network outside the house. The external network is connected to a central management center through a transmission medium, such as an optical cable or the like, and the central management center is connected to a server for providing a service to each household and an Internet line for externally providing a service. The internal network in the house requires a home gateway for controlling a terminal device and controlling and managing device states. In apartments, a wall pad installed in a living room serves as a home gateway. The wall pad connected to the home gateway controls devices in the house, and the devices are connected through the Ethernet. Services provided through the wall pad are shown in Table 1 below.

TABLE 1

| Classification | Content |
|---|---|
| Control service | living room illumination on/off, temperature control, gas shutoff, ventilation, digital door lock, elevator call |
| Security service | burglar detector, intrusion detector |
| Interoperating device | energy meter, smart switch, bathroom phone, kitchen TV |

A smart home service is mainly provided in apartments in which there is an environment for server management and the smart home service can be provided to many people. The smart home service uses the Ethernet technology as a wired network technology and uses WLAN and ZigBee technologies as a wireless network technology. Services provided through a wired or wireless network are shown in Table 2 below.

TABLE 2

| Network classification | Content |
|---|---|
| Wired network | living room illumination on/off, temperature control, gas shutoff, energy meter reading |
| Wireless network | digital door lock, ventilation, living room illumination |

In the smart home, devices are connected to all networks in the house through a switch installed at the entrance. The devices are connected from the switch installed at the entrance to the inside of the house and connected in a centralized form. The connected devices are WLAN devices, an external Internet network, a wall pad for controlling devices in the house, an interphone in the house, and the like. The connected devices collect various types of control data and the like and then transmit the collected data to a server which is present in a main distribution frame (MDF). A central server stores information collected from each household in a database server, allows a user to provide home information and control devices through the Internet on the basis of the collected data, and transmits the information back to the wall pad so that the information can be checked in the house. The information is provided to the user in the form of an image, a report, or text so that the user can easily understand the information. The wall pad serving as a home gateway in the house is also connected to the Ethernet, and an unshielded twisted pair (UTP) cable is connected to the wall pad.

The wall pad provides a function of displaying state information of devices under control in the house, opening or closing a front door, calling an elevator, and the like. When an error occurs in the state information of the controlled devices, it may be difficult to control the controlled devices or the devices may perform an incorrect operation. Therefore, data collection and transmission are important.

<Threats to Smart Home Security>

① In 2016, approximately 73,000 Internet protocol (IP) cameras around the world were hacked and broadcast live through a website called Insecam. It was revealed that the operator of the Insecam website hacked the cameras to raise awareness of the importance of security settings. ② In January 2019, there was a case where a door was successfully opened and closed without permission using a signal intercepted between a smart-home wall pad and a digital door lock. According to a company specializing in wireless network security, it is believed that the digital door lock was opened and closed using a signal replay attack between the wall pad and the digital door lock. A company specializing in wireless network security that conducted the attach test between the wall pad and the door lock said that the demonstration was conducted to raise awareness among users and inform them that wireless communication devices used in everyday life are defenseless against basic attacks.

The wall pad which is the center of a smart home is a device that gives commands to terminals in the smart home and controls the internal terminals. The wall pad is located in a living room or a master bedroom in the smart home and provides a function of controlling or managing the internal terminals. Accordingly, the wall pad may be considered the most central device in the smart home. ③ As a result of inspecting a smart apartment complex in Busan with 3,000 households in 2021, it was revealed that a hacker was able to immediately infiltrate the main server of the management office that controlled the entire apartment complex when the wall pad of one household was hacked. In this case, the problem is that all the households of the apartment complex were manipulated by the hacker rather than the single household. After the hacker accessed the server for managing the wall pad, the front door of each household was freely opened by the hacker, and the hacker performed a function of controlling operations of appliances, capturing indoor scenes through a camera embedded in the wall pad, and the like. Accordingly, the entire security system of the smart home substantially collapsed. This shows an example of how a security vulnerability is fatal when a wall pad for controlling various terminals in a smart home is infiltrated through a security vulnerability.

④ One day in January 2019, unidentified printouts suddenly started pouring out of the office printer of a domestic company. The printout showed the back of a man in a suit sitting on a sofa with a cigarette in his hand and the sentence "We have the ability to reach every single printer in the world!" This was a case where printers which are IoT devices were hacked and controlled through an output command. ⑤ In 2016, a distributed denial of service (DDOS) attack on the automatic temperature control system including the central heating and hot water system of an apartment complex shut down the central heating and hot water system, forcing apartment residents to live without a heating service for nearly a week.

<Installation and Technical Standards for Intelligent Home Network Facilities>

The Ministry of Land, Infrastructure and Transport, the Ministry of Trade, Industry and Energy, and the Ministry of Science and Information and Communication Technology (ICT) provided installation and technical standards for intelligent home network facilities which make network segmentation for apartment wall pads mandatory, through the Ministry of Land, Infrastructure and Transport notification No. 2021-1533, the Ministry of Trade, Industry and Energy notification No. 2021-240, and the Ministry of Science and ICT notification No. 2021-112. Since July 2022, segmentation of Internet networks between households has been mandated in newly built apartments, and experts have also emphasized that segmentation of networks between households is the best option and absolutely necessary for the time. Network segmentation involves separating networks by household. For example, 500 networks are physically created in an apartment complex where 500 households live, and this requires a high cost and long time. According to the revised technical standards, these technical standards apply to new buildings that receive architectural approval from Jul. 1, 2022, when home network facilities are installed. However, existing complexes and buildings that have previously received architectural approval are not subject to mandatory network segmentation, and network segmentation is not a fundamental solution to security threats.

Therefore, an exemplary embodiment of the present invention provides a solution for connecting the user terminal 100 to the PSU 600 using Bluetooth for pairing two devices within a physical distance, performing user registration using a QR code and Bluetooth pairing in the case of initial registration, setting the user terminal 100 as a master terminal when the user terminal 100 is registered and authenticated, fundamentally preventing infiltration by a hacker by allowing data communication only between the IoT device 500 and the additional terminal specified by the master, allowing various devices and terminals connected to the home network to access the Internet through the PSU 600, and preventing infiltration and theft by a hacker through a firewall, virtual dispersive networking (VDN), and data encryption.

Referring to FIG. 2, when the user terminal 100 accesses the security-service-providing server 300 using a QR code and then uploads PSU information and user information, the registration part 310 may register the user terminal 100, the PSU 600, the user information, and the PSU information. The PSU 600 may be connected to a home network. Since the PSU 600 is portable, the PSU 600 can be carried to a new residence and reinstalled there even when it is necessary to move a home network for a reason such as a move or the like. The PSU information may include, but is not limited to, a media access control (MAC) address and an authentication key of the PSU 600. Information which has not been listed above is not excluded, and the PSU information may be changed according to an embodiment or update.

In order for a user to register the PSU 600 through the user terminal 100 and authenticate and register the user terminal 100, it is necessary to meet the physical distance between the user terminal 100 and the PSU 600. In other words, ① for Bluetooth pairing, it is necessary to maintain the physical distance between two terminals within 10 meters. Unlike the case where a hacker can access a home network gateway simply by accessing the Internet, an exemplary embodiment of the present invention requires meeting the physical distance. Even when the physical distance is met, it is necessary to acquire an access right by scanning the QR code. A hacker who only has the QR code or only meets the physical distance can neither access the security-service-providing server 300 nor be registered as a master. Finally, ③ it is necessary to authenticate the user by authenticating the authentication key, the MAC address, and the like of the PSU 600 and checking an authentication key of the user of the user terminal 100 and the like. When the user terminal 100 is not connected to the home network, the MAC address of the PSU 600 is not authenticated, or there is no authentication key, the user is not registered as a master. When the user terminal 100 and the PSU 600 are paired together and an initial user registration procedure is finished, the user is designated as a master. The master can set or change a security policy, register the additional terminal 400 and the IoT device 500, perform real-time monitoring, and receive a warning, alarm, and the like about a security threat.

When the user terminal 100 attempts to access the Internet, the security connection part 320 may connect the user terminal 100 to the Internet through the PSU 600 according to a prestored security policy. The user terminal 100 may access the PSU 600 using the QR code, upload the PSU information and the user information of the PSU 600, and then be connected to the Internet according to the prestored security policy. The PSU 600 may be a virtual private network (VPN)-based portable security device that is provided between a home gateway and an Internet network and includes a CPU and a memory. Also, the PSU 600 may be a device that encrypts data between the home network and the Internet, performs network segmentation of a data transmission section of the home network using the VPN, blocks an unauthorized user's access to the home network, the IoT device 500, and the user terminal 100, and includes a Linux-based dedicated operating system (OS) and a database management system (DBMS). Accordingly, the PSU 600 runs itself, does not necessarily require communication with the security-service-providing server 300 according to the exemplary embodiment of the present invention, and is connected to the security-service-providing server 300 only for an update. Therefore, it is possible to minimize the risk of hacking that may occur in communication between the PSU 600 and the security-service-providing server 300.

<Transport Layer Security (TLS)>

For a service in a safe IoT environment, it is necessary to consider encryption communication employing a network security protocol. As a network security protocol, there is a TLS protocol defined by the Internet Engineering Task Force (IETF). The IoT device 500 with limited resources may use TLS protocol version 1.2 and version 1.3 in an open platform environment in consideration of a load on the TLS protocol which is a network security protocol. Also, the performance of a major encryption algorithm supported by version 1.3 may be analyzed to set appropriate network security protocol attributes for the specifications of the IoT device 500.

Most IoT communication protocols have characteristics including light weight, flexibility, expandability, and the like for appropriate communication for an IoT environment. However, due to limited memory and performance, no security function is applied to most IoT communication protocols, or most IoT communication protocols lack consideration of security. For example, message queuing telemetry transport (MQTT), which is a message protocol generally used in an IoT environment, does not have any security standard, and a network section is unreliable in a local network in which the transmission control protocol (TCP)/IP is used together with other protocols. The constrained application protocol (CoAP), which is another message protocol, provides security, such as TLS, through datagram transport layer security (DTLS) but is a heavy security technique in an IoT environment. Therefore, to build a safe security communication environment, an appropriate lightweight encryption protocol for the limited characteristics of the IoT device 500 is necessary. Currently, various lightweight encryption protocols that may run in an IoT environment are under development, but new protocols may have latent vulnerabilities unlike existing proven technologies. Therefore, it is necessary to combine an IoT communication protocol with TLS that provides proven encryption communication and authentication and consider using TLS version 1.3 which addresses the encryption and performance issues of TLS version 1.2.

<Cipher Suite>

In TLS version 1.3, static Rivest-Shamir-Adleman (RSA) and Diffie-Hellman are removed from the list of supported cipher suites, and all public key-based key exchange mechanisms provide forward secrecy. Also, TLS version 1.3 stops supporting legacy algorithms, such as Rivest cipher 4 (RC4), cipher block chaining (CBC), and triple data encryption standard (3DES), and all symmetric key encryption algorithms of TLS version 1.3 may enhance security using an authenticated encryption with associated data (AEAD) algorithm. In addition, the negotiation method of cipher suites is switched from a method of using an existing authentication and key exchange algorithm and an existing encryption algorithm in combination to a method of separately selecting an existing authentication and key exchange algorithm and an existing encryption algorithm, and thus it is possible to enhance the expandability of an encryption algorithm to be added.

<Handshake>

In the overall TLS handshake message flow of TLS version 1.2 and version 1.3, a handshake of TLS version 1.2 is 2-round trip time (RTT) including change cipher spec, whereas a handshake of TLS version 1.3 is reduced to 1-RTT by decreasing message exchange, such as change cipher spec, through an extension. A server may select an encryption algorithm and parameter on the basis of the extension information of a ClientHello message and thus may encrypt all handshake messages after a ServerHello message. An increase in the handshake speed of TLS version 1.3 may be expected through analysis of a request for comments (RFC) 8446 standard, and security may be improved through an improvement in a list of supported encryption algorithms and the like. It is obvious that various protocols and encryption algorithms other than the foregoing network protocols or encryption algorithms may be used.

<End-to-End Lightweight Encryption>

<Speck>

Speck is an encryption method published by the US National Security Agency (NSA) and is a family of lightweight block ciphers having a Feistel structure. According to Speck, encryption and decryption are performed through computation including addition, rotation, and XOR (ARX). Speck was designed focusing on software operations and is a family of ciphers optimized for a microcontroller platform. According to the NSA, flexibility and performance of Speck are presented as the main strengths. Speck supports various block/key lengths (48/96, 64/96, 64/128, 96/96, 96/144, 128/128, 128/192, and 128/256) and thus may be used in various environments.

<Elliptic Curve Cryptography (ECC)>

An ECC algorithm is a cryptosystem in which a product group of finite fields used in discrete logarithms is replaced with a group of elliptic curves. The ECC algorithm shows an equal level of safety with a shorter key size than other cryptosystems. In a cryptography system employing the ECC algorithm, a public key combined with a random number is shared with each terminal, synchronized and encrypted with a secret key that cannot be guessed by attackers. To implement such a cryptosystem, a key distribution algorithm and a message encryption algorithm are employed. A representative key distribution method of the ECC algorithm is an elliptic curve Diffie-Hellman (ECDH) algorithm. Message encryption is performed through a process in which, after a secret key is calculated, a terminal calculates and transmits a message and a secret key to a server and a process in which the server calculates an encrypted message using the secret key. The ECDH algorithm is used for a security problem of phase-shift keying (PSK)-based symmetric key cryptography which is used by sharing a key in advance due to performance overhead, and thus is appropriate for an IoT environment.

The threat prevention part 330 may block access by a threatening terminal which is not authenticated (not shown) through the PSU 600.

The user authentication part 340 may store the user information of the user terminal 100, transmit the user authentication key to the user terminal 100, and then designate the user terminal 100 as a master so that the user terminal 100 may use the user policy management solution. The user policy management solution installed on the user terminal 100 may be a solution for setting a firewall and a VPN policy of the PSU 600, monitoring the firewall and the VPN of the PSU 600 in real time, and managing a log of the PSU 600.

<Kerberos Authentication>

For people who use a smart home service through wall pads in households, authentication may be an inconvenient procedure resulting from automation. However, it is problematic if anyone in a household can freely use the smart home service without authentication. In this regard, authentication is for the purpose of protecting a control display device, such as a wall pad, from an internal attacker. This is because various internal attacks can be handled simply through authentication. In particular, authentication is effective against shared attacks and attacks of a household member and a manager who have already been registered as authenticated users. Considering the daily time of using a wall pad, the application of an authentication technology provides authentication, stability, access control, transparency, and reliability to not only a wall pad but also a management server in the complex. Also, Kerberos authentication provides confidentiality through encryption as shown in Expressions 1 to 3 below and thus is effective against a type of intercept attacks such as a man in the middle (MITM) attack. Even when random access frequently occurs, authentication is performed in every session using the following encryption and a ticket and brings about a significant effect.

$$C \rightarrow AS{:}ID_c \| ID_{tgs} \quad AS \rightarrow C{:}E(K_c, \text{Ticket}_{tgs}) \qquad \text{[Expression 1]}$$

Expression 1 is used once whenever a user who uses the wall pad logs on to the wall pad. Identification authentication information is encrypted together with a ticket using an encryption key and issued by an authentication system. MITM attacks are handled using the identification authentication information and the ticket.

$$C \rightarrow TGS{:}ID_c \| IDV \| \text{Ticket}_{tgs}, \; TGS \rightarrow C{:}\text{Ticket}_v \qquad \text{[Expression 2]}$$

Expression 2 is used once for each service type. In this way, a public key related to a person with whom the user wants to communicate is issued by a ticket server, and it is possible to check authentication of a specific service. Therefore, the management server can easily access a billing service of the wall pad.

$$\text{Ticket}_{tgs} = E(K_{tgs}, [ID_c \| AD_c \| ID_{tgs} \| TS_1 \| \text{Lifetime}_1])$$
$$\text{Ticket}_v = E(K_v, [ID_c \| AD_c \| ID_v \| TS_2 \| \text{Lifetime}_2]) \qquad \text{[Expression 3]}$$

Expression 3 is used once in every service session. Authentication is performed using a ticket in every session, and thus a reliable connection can be made. Here, TGS is a ticket granting server, AS is an authentication server, Vis a server, $AD_c$ is a network address of C, C is a client, $K_v$ is a secret encryption key shared by AS and V, $ID_c$ is an identifier of a user with C, and $ID_v$ is an identifier of V.

When at least one IoT device and the at least one additional terminal 400 are connected to the home network after the user terminal 100 is designated as a master, the addition management part 350 may register the at least one IoT device and the at least one additional terminal 400 through a master approval procedure of the user terminal 100. Here, a manager right, that is, a master right, is used for addition. Accordingly, when the same authentication information is used, a replay attack with the same password may be problematic. In the case of using the master right, an initially authenticated means of authentication, such as the authentication key, a password, or the like, may be changed and used. Also, the addition management part 350 makes it possible to cope with intercept attacks and impersonation attacks of attackers among frequent random access to the management server using the foregoing Kerberos authentication technology.

The leakage prevention part 360 may prevent IoT data of the at least one IoT device 500 from being transmitted through the Internet. The leakage prevention part 360 may be set to perform zero-trust-based GPS tracking even when IoT data is transmitted.

The policy setting part 370 may allow the user terminal 100 and the PSU 600 to be paired on the basis of Bluetooth communication and allow the user terminal 100 to set a security policy including a firewall policy and data encryption of the PSU 600 using the user policy management solution. When the user is a common person, the user may not be familiar with policy management, setting, and the like, and there is a high chance of a human error occurring due to low understanding. For example, access to an external IP address to be blocked may be allowed, and important internal assets may be accessed, which may lead to serious infringement incidents such as service interruption, virus distribution, personal information leakage, and the like. When a policy is verified in advance and evaluated in terms of management, it is possible to reduce human errors and complement administration and management.

<Policy Check>

① In a pre-policy-check operation, a backup file of policies may be exported from the firewall and input to a platform of the present invention. ② In a check operation, the input policy file may be analyzed to identify duplicate policies and a policy with a logical error. ③ In a post-check operation, identification results may be output as a report in a determined format. ④ For security purposes, the policy file may be completely removed. A report may be written on the basis of specifications of required functions. Here, the report may be roughly divided into three sections. As a first section, a base profile shows a check date, a policy file path, and a file version which are basic information related to the check. As a second section, a result shows a summary of policy check results. The summary shows the number of overlap policies and duplicate policies in use. As a third section, detailed data show detailed check results. The detailed check results show in which service which IP address is a duplicate or does not operate.

<Policy Test Process>

First, sequence IDs are classified by protocol type. This corresponds to a case where all protocols and IP addresses/ports are identical. When any one of them does not correspond to the others, the protocol or IP address/port is not a test target. Accordingly, in the process of reading the policy file, sets are made and classified by protocol, and thus it is possible to further reduce the number of unnecessary tests. Second, the range of IP addresses/ports of policies which use the same protocol is tested to extract duplicate range values. In the case of an IP range test, an IP address expressed as a string is converted into an integer, and the range test is performed in the same way as on ports which are expressed in integers by default. Third, allowed or prohibited operations are checked in each policy, and two policies are determined as duplicate policies when operations of the two policies are identical to each other. When operations of the two policies are different from each other, it is determined that the lower order one of the two policies does not operate. Fourth, all the policies are tested, and duplicate IP address/port and protocol result values are output in a report format. As guidelines of the foregoing policy test, the guidelines of the Korea Internet & Security Agency or the Personal information and Information Security Management System (ISMS-P) may be used.

The access restriction part 380 may allow the at least one additional terminal 400 which has been authenticated and registered by the user terminal using the user policy management solution, or the user terminal 100 to perform data communication only through a management solution for the IoT device 500.

The packet permission part 390 may allow a packet of the user terminal 100 or the at least one additional terminal 400 connected to the home network through a security policy solution of the PSU 600 to access and use the Internet.

An operation process according to the configuration of the security-service-providing server of FIG. 2 described above will be described in detail below with examples of FIGS. 3A to 3E, 4A and 4B. However, this is only one of various embodiments of the present invention, and the present invention is not limited thereto.

Figure 3A:
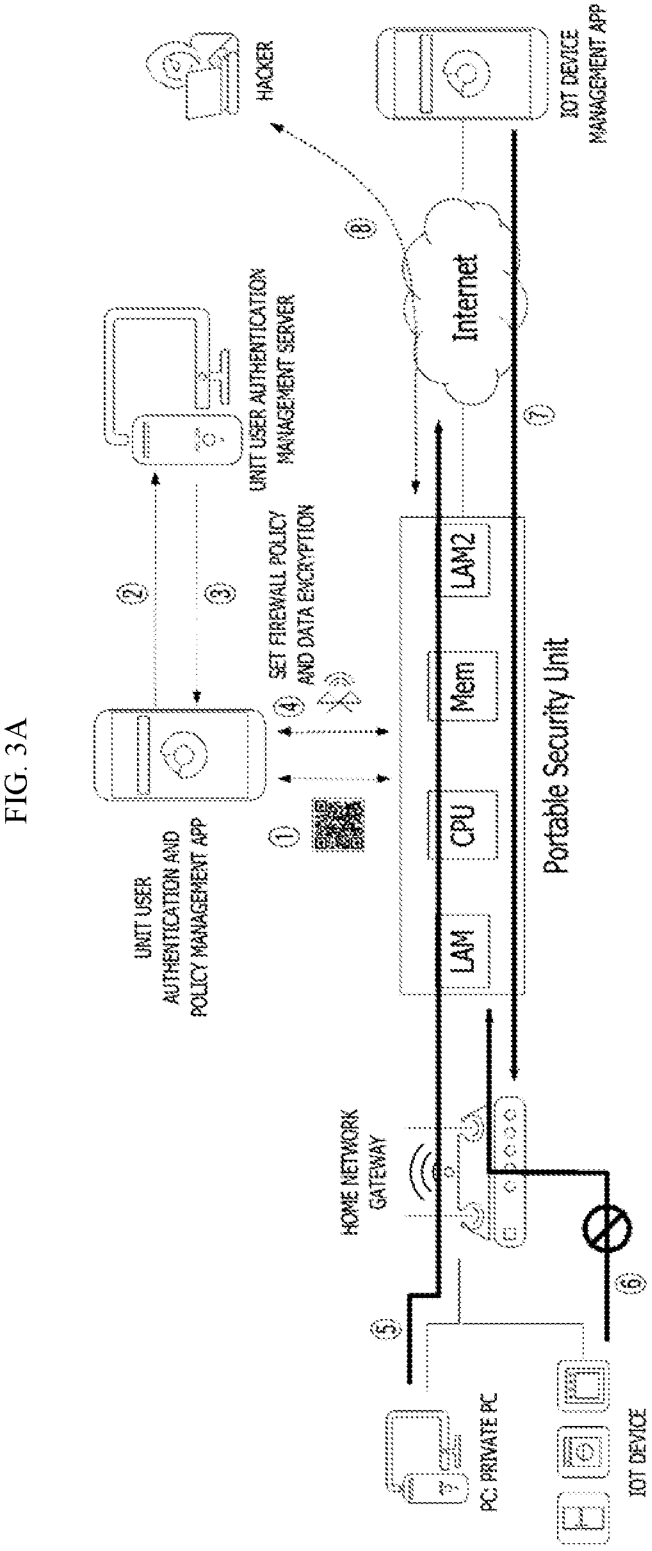
Figure 3D:
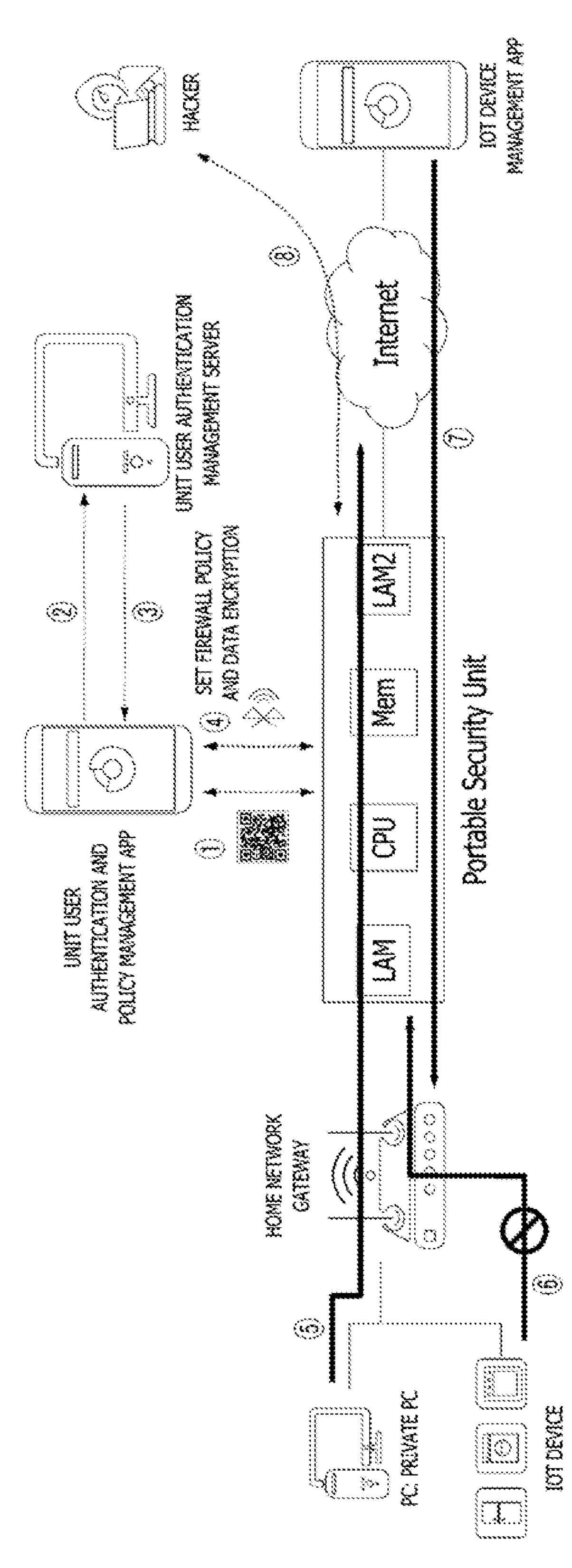

Referring to FIG. 3A, a solution according to an exemplary embodiment of the present invention ① allows the user terminal 100 to access the PSU 600 using a QR code in order to initially register and authenticate the user terminal 100 for the PSU 600, ② transmits a MAC address and an authentication key of the PSU 600, ③ stores user (master) information, transmits the authentication key, and then can use a user policy management solution (application). An additional user may be registered through a master approval procedure. Also, the solution may ④ set a firewall policy, a data encryption function, and the like of the PSU 600 through the user policy management solution using Bluetooth. According to the security policy of PSU 600 indicated as ⑤ to ⑧, personal PC packets of the home network are allowed to use the Internet, data of the IoT device 500 can be communicated only through an authenticated unit user's management application for the IoT device 500, and unauthenticated hackers can be blocked through the PSU 600.

As shown in FIG. 3B, the solution according to the exemplary embodiment of the present invention can strengthen security by preventing hacking, contribute to safe information circulation, and reduce construction and operation costs. As shown in FIG. 3C, the solution can reduce a load on each household for physical network segmentation while providing a better security solution as well as the same functionality. Also, the solution is portable and thus can be taken when the user moves, which can save costs and reduce maintenance costs. In the solution shown in FIG. 3D, components (the PSU 600, the security-service-providing server 300, and the policy management solution) shown in FIG. 3E may be provided. The system according to the exemplary embodiment of the present invention may have distinctiveness as shown in FIGS. 4A and 4B.

Since undescribed details of the method of providing an end-to-end security service using a PSU based on an intelligent home network illustrated in FIGS. 2 to 4B are the same as described above regarding the method of providing an end-to-end security service using a PSU based on an intelligent home network through FIG. 1 or may be inferred from the description, description thereof will be omitted.

Figure 5:
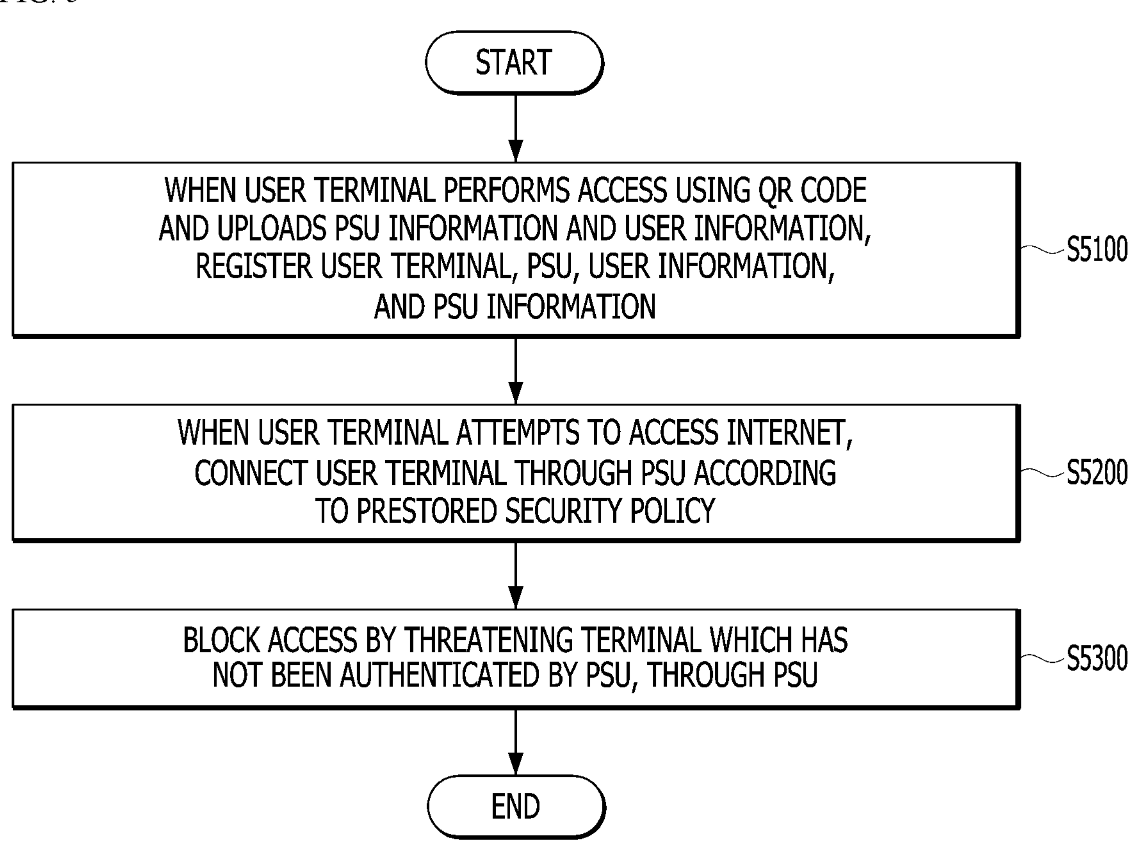
FIG. 5 is a flowchart illustrating a method of providing an end-to-end security service using a PSU based on an intelligent home network according to an exemplary embodiment of the present invention.

FIG. 5 is a flowchart illustrating a process of transmitting and receiving data between components included in the system for providing an end-to-end security service using a PSU based on an intelligent home network illustrated in FIG. 1 according to the exemplary embodiment of the present invention. An example of a process of transmitting and receiving data between components will be described below through FIG. 5. However, the present invention is not limited thereto, and it is obvious to those of ordinary skill in the art that the process of transmitting and receiving data illustrated in FIG. 5 may vary depending on the various embodiments described above.

Referring to FIG. 5, when a user terminal accesses a security-service-providing server and then uploads PSU information and user information, the security-service-providing server registers the user terminal, a PSU, the user information, and the PSU information (S5100).

When the user terminal attempts to access the Internet, the security-service-providing server connects the user terminal to the Internet through the PSU according to a prestored security policy (S5200) and blocks access by a threatening terminal which has not been authenticated by the PSU, through the PSU (S5300).

The order of the foregoing operations S5100 to S5300 is merely illustrative, and the present invention is not limited thereto. In other words, the order of the foregoing operations S5100 to S5300 may be changed, and some of the operations may be performed simultaneously or removed.

Since undescribed details of the method of providing an end-to-end security service using a PSU based on an intelligent home network illustrated in FIG. 5 are the same as described above regarding the method of providing an end-to-end security service using a PSU based on an intelligent home network through FIGS. 1 to 4B or may be inferred from the description, description thereof will be omitted.

The method of providing an end-to-end security service using a PSU based on an intelligent home network according to the exemplary embodiment illustrated in FIG. may be implemented in the form of a recording medium including computer-executable instructions such as an application or program module executed by a computer. The computer-readable recording medium may be any available medium that is accessed by a computer, and may be a volatile or non-volatile medium and a detachable or non-detachable medium. Also, the computer-readable recording medium may be any computer storage medium. The computer-storage medium may be a volatile or non-volatile medium and a detachable or non-detachable medium that is implemented using any method or technology for storing information such as computer-readable instructions, data structures, program modules, or other data.

The foregoing method of providing an end-to-end security service using a PSU based on an intelligent home network according to the exemplary embodiment of the present invention may be performed by an application (which may include a program included in a platform, an OS, or the like basically installed on a terminal) basically installed on the terminal or an application (i.e., program) that is directly installed by a user on a master terminal through an application providing server such as an application store server, a web server related to an application or the corresponding service. In this regard, the foregoing method of providing an end-to-end security service using a PSU based on an intelligent home network according to the exemplary embodiment of the present invention may be basically installed on a terminal or may be implemented as an application (i.e., program) to be directly installed by a user and recorded on a recording medium which is readable by a computer such as a terminal or the like.

According to any one of the foregoing solutions of the present invention, it is possible to fundamentally block a path for a hacker to access a home network through Internet access alone by performing initial authentication through a QR code, an OTP, and Bluetooth pairing in the case of connecting a PSU to a user terminal, apply an end-to-end security solution by simply providing the PSU and authenticating and registering the user terminal without communication with a security-service-providing server due to a security policy and an OS installed in the PSU, and eliminate a possibility that a hacker will access an IoT device or take data and protect a data transmission section through data encryption and a VPN by allowing only the user terminal registered and authenticated through the PSU to transmit and receive data to and from the IoT device when the user terminal registers the IoT device using a user policy management solution.

The above description of the present invention is for illustration, and those of ordinary skill in the art should understand that the present invention can be easily modified into other specific forms without changing the technical spirit or necessary features of the present invention. Therefore, it is to be understood that the exemplary embodiments described above are illustrative and not limiting in all aspects. For example, each component described as a unitary part may be implemented in distributed forms, and likewise, components described as distributed parts may be implemented in a combined form.

The scope of the present invention is presented by the following claims rather than the foregoing detailed description, and all changes or modifications derived from the definitions and scope of the claims and their equivalents should be construed as falling within the scope of the present invention.

What is claimed is:

1. A system for providing an end-to-end security service using a portable security unit (PSU) based on an intelligent home network, the system comprising:

a PSU connected to a home network;

a user terminal configured to access the PSU using a quick response (QR) code and upload PSU information of the PSU and user information and connected to an Internet according to a security policy prestored in the PSU; and a security-service-providing server comprising:

a processor; and a memory storing instructions that, when executed by the processor, cause the processor to:

register, when the user terminal accesses the security-service-providing server using the QR code and uploads the PSU information and the user information, an association between (i) the PSU information including a media access control (MAC) address and a PSU authentication key and (ii) the user information of the user terminal;

store the user information of the user terminal;

transmit a user authentication key to the user terminal;

designate the user terminal as a master terminal authorized to use a user policy management solution;

connect the user terminal to the Internet through the PSU according to the prestored security policy when the user terminal attempts to access the Internet; and block access to the user terminal in a case that has not been authenticated by the PSU, through the PSU.

2. The system of claim 1, wherein the security-service-providing server further comprises an addition management part configured to register, when at least one Internet of things (IoT) device and at least one additional terminal are connected to the home network after the user terminal is designated as the master, the at least one IoT device and the at least one additional terminal through a master approval procedure of the user terminal.

3. The system of claim 2, wherein the security-service-providing server further comprises a leakage prevention part configured to prevent IoT data of the at least one IoT device from being transmitted through the Internet.

4. The system of claim 1, wherein the security-service-providing server further comprises a policy setting part configured to allow the user terminal and the PSU to be paired on the basis of Bluetooth communication and allow the user terminal to set a security policy including a firewall policy and data encryption of the PSU using the user policy management solution.

5. The system of claim 2, wherein the security-service-providing server further comprises an access restriction part configured to allow the at least one additional terminal which has been authenticated and registered by the user terminal using the user policy management solution, or the user terminal to perform data communication only through an IoT device management solution.

6. The system of claim 1, wherein the PSU is provided between a home network gateway and an Internet network, is a portable security device including a central processing unit (CPU) and a memory and based on a firewall and a virtual private network (VPN), performs data encryption between the home network and the Internet, performs network segmentation of a data transmission section of the home network using the VPN, blocks an unauthorized user's access to the home network, an Internet of things (IoT) device, and the user terminal, and includes a Linux-based dedicated operating system (OS) and a database management system (DBMS).

7. The system of claim 6, wherein the policy management solution installed on the user terminal sets a firewall and a VPN policy of the PSU, monitors the firewall and the VPN of the PSU in real time, and manages a log of the PSU.

* * * * *